July 17, 1928.

F. M. RITTER 1,677,250

LAWN MOWER ATTACHMENT

Filed Aug. 26, 1927

INVENTOR
Frank M. Ritter

BY
Chas. J. Diller
ATTORNEY

July 17, 1928.  1,677,250
F. M. RITTER
LAWN MOWER ATTACHMENT
Filed Aug. 26, 1927  2 Sheets-Sheet 2
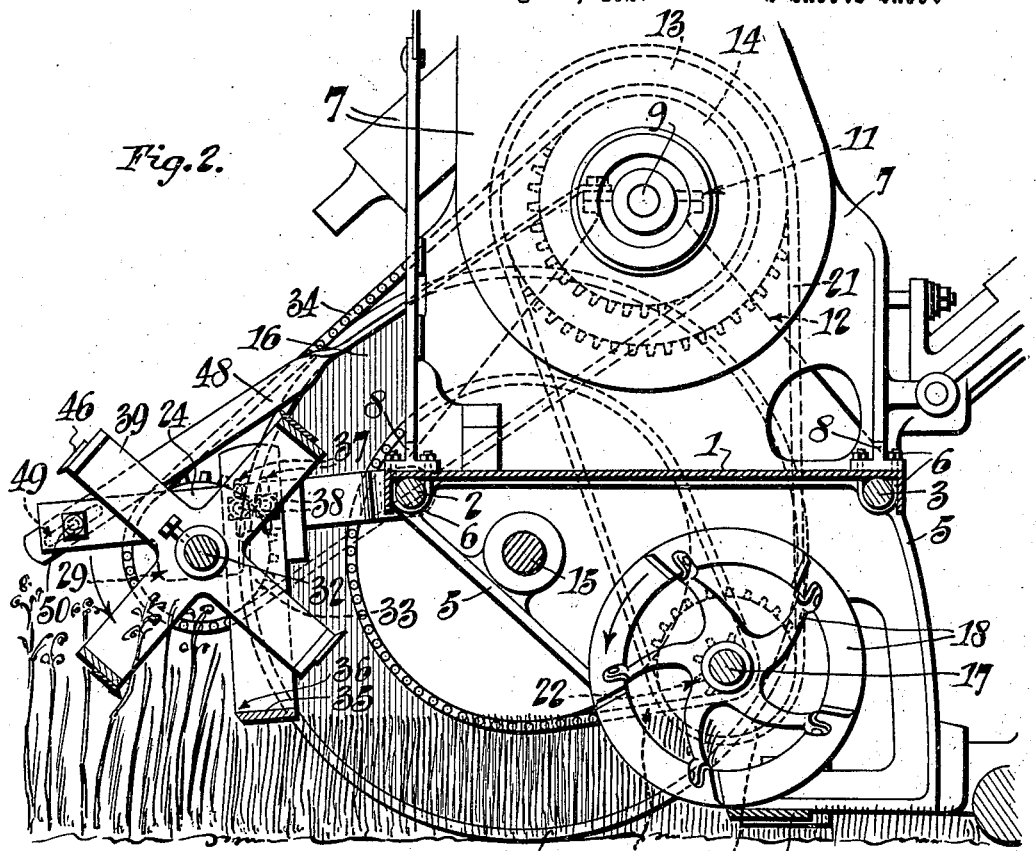
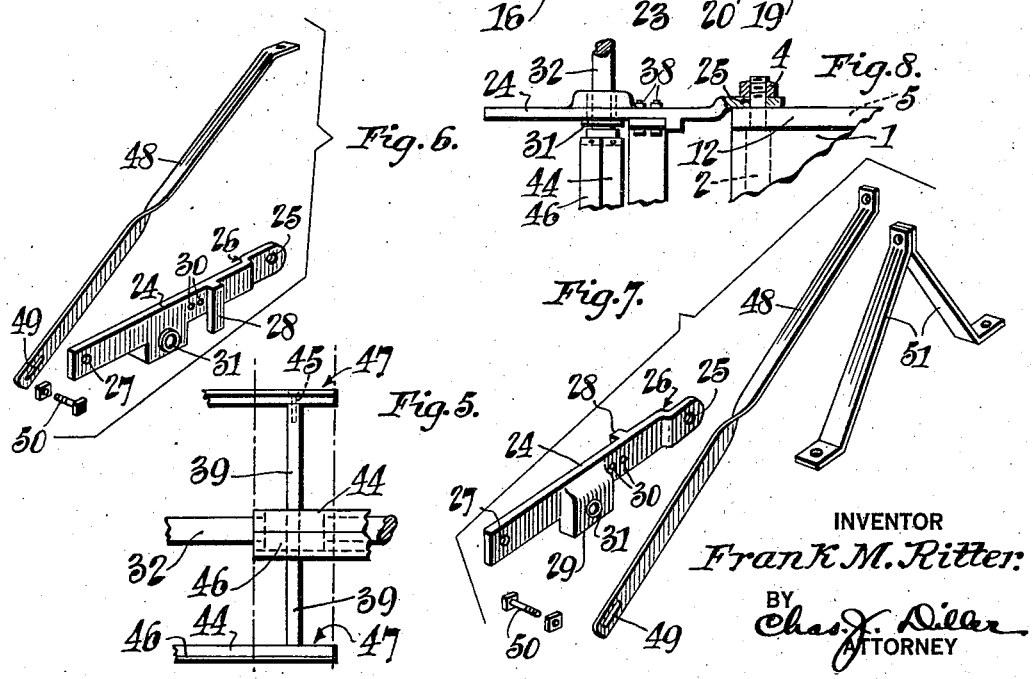
INVENTOR
Frank M. Ritter
BY
Chas. J. Diller
ATTORNEY Patented July 17, 1928.

1,677,250

UNITED STATES PATENT OFFICE.

FRANK MONTGOMERY RITTER, OF WASHINGTON, DISTRICT OF COLUMBIA, ASSIGNOR OF THREE-FOURTHS TO JAMES VANSANDT HUTCHINS, OF WASHINGTON, DISTRICT OF COLUMBIA.

LAWN-MOWER ATTACHMENT.

Application filed August 26, 1927. Serial No. 215,720.

The invention generally has reference to lawn mowers and primarily has for its object to provide a simple and efficiently operable attachment for lawn mowers, inexpensive to manufacture, and which when properly mounted upon the mower, serves to top the weeds and grass in advance of the mower cutting element and reduce said weeds and grass to a length for assuring efficient and unstrained service of said cutting element without danger of clogging or breakage.

In its more detailed nature the invention resides in the provision of a novel grass and weed topping reel or cutting element, and novel means to mount the same upon a lawn mower in advance of and on a cutting plane higher than that of the main cutting element of said lawn mower.

The invention further resides in the provision of certain advantageous structural features in the cutting element or topping reel and mounting devices whereby a more efficient cutting action is provided for than is possible in the use of common types of cutters, and whereby the said element may be quickly and conveniently mounted upon the mower and easily adjusted to conditions of use.

With the above and other objects in view that will hereinafter appear, the invention further resides in the novel details of construction, combination and arrangement of parts, all of which will be first fully described in the following detailed description, then be particularly pointed out in the appended claims, reference being had to the accompanying drawings, in which:—

Figure 2 is a vertical cross section illustrating the attachment mounted upon a mower.

Figure 5 is a face view of the central portion of the topping reel.

Figure 6 is a perspective view of the hanger arm and brace arm mountable at the right hand side of the mower.

Figure 7 is a perspective view of the hanger arm, brace arm and brace bracket mountable at the left hand side of the mower.

Figure 8 is a plan view of one hanger arm and adjacent parts of the mower frame and the topping reel, parts being in section to illustrate the means of securing the said arm upon the said frame.

Figure 1:
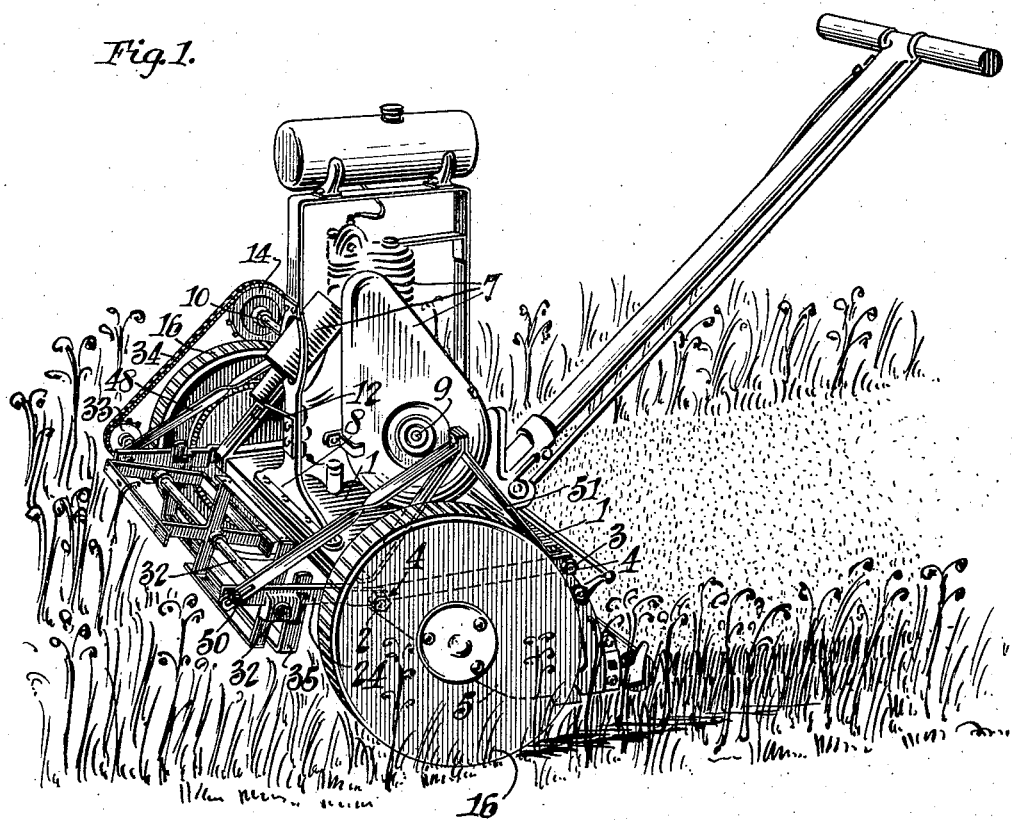
Figure 1 is a perspective view illustrating the invention in use.

In the drawings, in which like numerals of reference indicate like parts in all of the figures, 1 designates a power lawn mower frame plate and 2 and 3 the front and rear cross frame rods. The ends of the rods are shouldered and threaded and pass through and are secured by nuts 4 to the end frame castings 5 to secure the said frames in parallel spaced relation.

The plate 1 is secured to position upon the frames 5 by U-bolts 6 which partially surround the rods 2 and 3 and pass through the said plate, and the said U-bolts also serve to secure the power motor 7 upon the plate 1 by passing through and clamping the feet 8 of that motor upon the said plate.

The motor or engine shaft 9 is projected beyond the housing at one end as at 10 and passes through a bearing 11 provided in the bearing standard 12 which extends vertically from the frame 5 at the right hand side of the mower. Sprockets 13 and 14 are secured upon the extended shaft end and serve a purpose later to be described.

A cross shaft 15 is rotatable in bearings provided therefor in the end frames 5 and has mounted thereupon the traction wheels 16. Another cross shaft 17 is rotatable in bearings provided therefor in the said end frames and carries the usual multi-blade mower 18 which coacts with the adjustable cross or ledger bar 19 in cutting the grass to the desired height.

To the sprocket 20 secured upon the shaft 17 rotation is imparted through the chain 21 from the sprocket 13 on the motor shaft. The shaft 17 is also provided at each end with a small sprocket 22 which serve to impart rotation, when desired, to the traction wheels 16 through the transmission connections 23.

The parts thus far described, with the exception of the sprocket 14, are conventional and form parts of a type of power mower known to the trade and upon which the attachment forming the subject matter of my invention is especially adaptable to use. It should be understood however, that while I have disclosed the invention on this particular type of mower, it is not so limited in use, but may be employed in association with any mower, power or hand type, upon which it may be conveniently and practically mounted.

In the practical development of my invention I provide a pair of hanger arms 24 each apertured at 25 at one end to fit the respective shouldered and threaded end of the front cross rod 2 and be secured thereupon by the nuts 4. See Figures 1, 6, 7 and 8.

The arms 24 are offset and bent inwardly slightly just in advance of the plate 1 as at 26, and are apertured at their free ends as at 27. Each said arm is also provided with a twist preventing lug 28, a bearing lug or enlargement 29, and a pair of apertures 30 adjacent and in advance of said lug 28. See Figures 6 and 8.

Suitable bores are provided in the bearing lugs 29 in which bearing bushings 31 are replaceably mounted to provide proper bearing for the cross shaft 32. See Figures 6 and 8.

Figure 3:
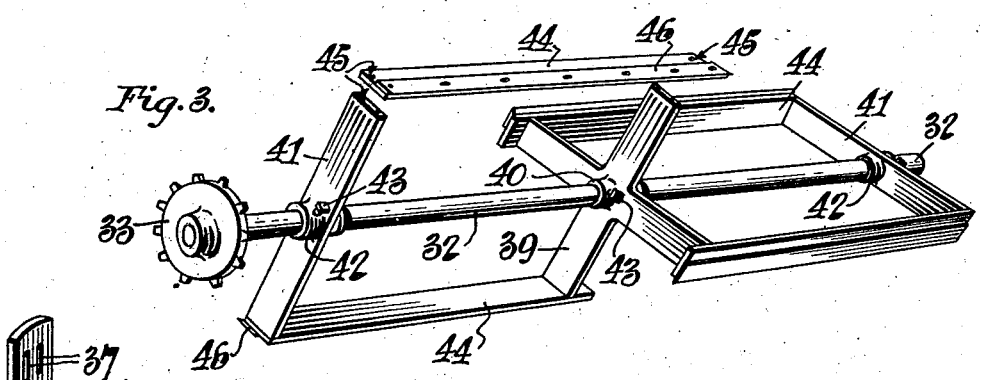
Figure 3 is a perspective view of the topping reel per se, one cutter or cross bar being shown separated.
Figure 4:
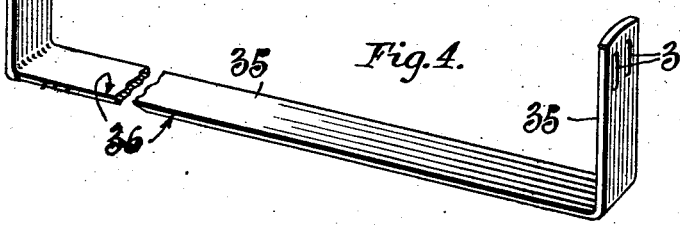
Figure 4 is a perspective view of the U-shaped adustable ledger bar.

A sprocket 33 is secured upon one end of the shaft 32 and is adapted to be rotated to turn the said shaft in its bearings by the chain 34 which is trained over the sprocket 14 on the motor shaft. See Figures 1, 2 and 3.

A U-shaped ledger bar 35 having a slightly bevelled advance edge 36 and parallel slots 37 in its side arms is provided and is vertically-adjustably secured upon the arms 24 by the bolts 38 which pass through the said slots and the apertures 30 of the said arms.

The rotatable shaft 32 forms a part of an auxiliary or advance weed and grass topping reel and the arms 24 serve to mount the said reel in advance of and on a higher cutting plane than that of the main cutter or mower 18 so that it will cut or top the tall grass and weeds that ordinarily could not be handled by the said main cutter and bring them down to a size for being conveniently and efficiently handled by said main cutter. This advance cutting reel is of peculiar construction and is adapted to cut the weeds and grass more efficiently than the commonly employed types of reels and with a consumption of relatively less power in the attainment of that object, and with less wear because of the fact that it can be rotated more slowly.

In the construction of this improved form of reel I provide a central cross arm spider 39 having a mounting boss 40, and two end arms or plates 41 having similar bosses 42, the said members 39 and 41 being secured to position upon the shaft 32, with each end plate 41 aligning one spider arm, by the set screws 43 which pass through taps in the bosses and engage the said shaft. Thus the end plates 41 are positioned at right angles to each other. See Figures 2 and 3.

The aligning arms or plates are connected by cross bars 44 removably secured at 45 to the said arm or plate ends and on the advance or cutting edge of each said bar a thin cutter blade 46 is removably and replaceably secured.

Each bar 44 and its blade 46 extends inwardly beyond the spider arm connection so that the two staggered individual cutting units overlap at the center as at 47 to assure perfect and complete cutting through the center as efficiently as though the knives or cutter blades extended full width without a break.

Thus the staggered units cut alternately one blade across all and a little more than one side, then the next in like manner on the other side, and so on, the cuts coming at alternate sides on quarters.

It is a well known fact that helical or curved blades, acting against the ledger bar, tend to and do force tough grass and weeds laterally and often merely deflect them downward without cutting them. This is especially true when the cutting edges are somewhat dull.

Also, these curved blades each cut in conjunction with the ledger bar at one point in their length only at a time, the point of the curve that is passing over the ledger bar at the particular moment, and must be rotated at relatively high speeds to make efficient even cutting possible. This necessitates the employment of a greater number of blades, and the use of more power than is necessary in the use of my improved topping reel, not to speak of the greatly increased wear to which such common types of curved blade high speed reel equipments are subjected.

By providing my straight blades and arranging them in staggered units the cuts are made against the ledger bar across the full length of a blade at once, first at one side then at the other. The strain on the blades is thus equalized and efficiently distributed and by making the broad cuts in the manner stated it is possible to rotate the reel at a relatively slow speed with an attendant reduction in power consumption and wear on the moving parts.

By providing the bars 44, very thin blades 46 may be employed without sacrificing cutting strength, and in addition, a great economy in blade material and blade reconditioning cost is effected since when a blade becomes worn it may be conveniently removed and discarded entirely in favor of a new one, or resharpened. The bars 44 provide the necessary strength, the blades 46 the fine cutting edge.

Brace arms 48 are provided and are slotted at their advance ends at 49 to receive the bolts 50 which pass through the apertures 27 in the advance ends of the arms 24 and adjustably support the said arm ends. The other ends of the arms 48 are secured one to the frame extension 12, see Figure 2, and the other to the brace bracket 51 mounted upon the frame plate 1, see Figures 1 and 7.

When it is desired to raise or lower the topping reel the nuts 4 and bolts 50 are loosened and the arms 24 moved pivotally on the ends of the rod 2 to the desired position. The nuts 4 and bolts 50 may then be retightened to secure the reel at the desired elevation above the ground.

The relation of the ledger bar 35 with the topping reel may be readily adjusted by proper manipulation of the slot, and bolt connections 37—38, the lugs 28 serving to prevent twisting of the ledger bar on its connections and also to absorb the shocks of engagement of reel and weeds during the topping function.

From the foregoing description, taken in connection with the accompanying drawings, it is thought that the novel details of construction, the manner of use and the advantages of my invention will be readily apparent to those skilled in the art to which it relates.

What I claim is:

1. The combination with a lawn mower having a cutting reel, a carrying frame including end frames and cross rods to secure them together, and means to impart rotation to the cutting reel; of a topping reel in advance of said cutting reel, trunnions projecting from the topping reel, hanger arms adjustably secured at one of their ends to the ends of one cross rod to project forwardly therefrom, bearings carried by said arms to receive the topping reel trunnions, brace rods connected at their advance ends to the projected ends of the arms and at their other ends to the mower frame, and means to transmit rotation to the topping reel from said rotation imparting means.

2. The combination with a lawn mower having a cutting reel, a carrying frame including end frames and cross rods to secure them together, and means to impart rotation to the cutting reel; of a topping reel in advance of said cutting reel, trunnions projecting from the topping reel, hanger arms pivotally-adjustably secured at one of their ends to the ends of one cross rod to project forwardly therefrom, bearings carried by said arms to receive the topping reel trunnions, brace rods adjustably slot and bolt connected at their advance ends to the projected ends of the arms and at their other ends to the mower frame, and means to transmit rotation to the topping reel from said rotation imparting means.

3. The combination with a lawn mower having a cutting reel, a carrying frame including end frames and cross rods to secure them together, and means to impart rotation to the cutting reel; of a topping reel in advance of said cutting reel, trunnions projecting from the topping reel, hanger arms adjustably secured at one of their ends to the ends of one cross rod to project forwardly therefrom, bearings carried by said arms to receive the topping reel trunnions, brace rods connected at their advance ends to the projected ends of the arms and at their other ends to the mower frame, twist preventing lugs carried by the hanger arms, a U-shaped ledger bar adjustably mounted on the hanger arms in coactive relation with the topping reel and in engagement with the twist preventing lugs, and means to transmit rotation to the topping reel from said rotation imparting means.

4. The combination with a lawn mower having a cutting reel, end frames in which the reel is supported and one of which has an upward bearing extension, cross rods to clamp the end frames together, a base plate carried by the rods, a power motor mounted on the base plate and having a shaft extended and bearing in the end frame extension bearing, traction wheels, and means to impart rotation to the reel and wheels from the motor shaft; of a weed and grass topping attachment comprising, an advance topping reed having trunnions, hanger arms apertured at one end to permit clamping onto the ends of one of the cross rods and having reel trunnion receiving bearing lugs, twist preventing lugs carried by the hanger arms, a U-shaped ledger bar adjustably carried by the hanger arms in coactive relation with the topping reel and lying against the twist preventing lugs, a brace bracket mounted on the base plate, and brace bars secured at one end to the frame extension and brace bracket respectively and adjustably bolt and slot connected to the free ends of the hanger arms at their other ends, and means to impart rotation to the topping reel from the motor shaft.

5. An attachment of the character described comprising a weed and grass topping reel having trunnions, hanger arms apertured at one end for adjustable pivotal mounting on a suitable supporting frame and having reel-trunnions-receiving bearing lugs, twist preventing lugs carried by the hanger arms, a U-shaped ledger bar adjustably carried by the hanger arms in coactive relation with the topping reel and lying against the twist preventing lugs, and brace bars adjustably connected to the free ends of the hanger arms and adapted to have their other ends secured to a suitable supporting means.

6. The combination with a lawn mower having a cutting reel, a frame, and means to impart rotation to the cutting reel; of a topping reel in advance of said cutting reel, trunnions projecting from the topping reel, hanger arms adjustably secured at one of their ends to a part of the frame to project forwardly therefrom, bearings carried by said arms to receive the topping reel trunnions, brace rods connected at their advance ends to the projected ends of the arms and at their other ends to the frame, a ledger bar carried by the hanger arms in coactive relation with the topping reel, and means to transmit rotation to the advance reel from said rotation imparting means.

7. The combination with a lawn mower having a cutting reel, a frame, and means to impart rotation to the cutting reel; of a topping reel in advance of said cutting reel, trunnions projecting from the topping reel, hanger arms secured at one of their ends to a part of the frame to project forwardly therefrom, bearings carried by said arms to receive the topping reel trunnions, brace rods connected at their advance ends to the projected ends of the arms and at their other ends to the frame, twist preventing lugs carried by the hanger arms, a U-shaped ledger bar mounted on the hanger arms in coactive relation with the topping reel and in engagement with the twist preventing lugs, and means to transmit rotation to the advance reel from said rotation imparting means.

FRANK MONTGOMERY RITTER.